(12) United States Patent
Kawano (10) Patent No.: US 9,900,454 B2
(45) Date of Patent: Feb. 20, 2018

(54) IMAGE FORMING APPARATUS, JOB PROCESSING CONTROL METHOD AND NON-TRANSITORY COMPUTER-READABLE STORAGE MEDIUM STORING JOB PROCESSING CONTROL PROGRAM

(71) Applicant: KONICA MINOLTA, INC., Chiyoda-ku, Tokyo (JP)

(72) Inventor: Tatsuya Kawano, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/000,493

(22) Filed: Jan. 19, 2016

(65) Prior Publication Data

US 2016/0210086 A1 Jul. 21, 2016

(30) Foreign Application Priority Data

Jan. 21, 2015 (JP) .................................. 2015-009078

(51) Int. Cl.
*G06F 3/12* (2006.01)
*H04N 1/00* (2006.01)
*H04N 1/32* (2006.01)

(52) U.S. Cl.
CPC ....... *H04N 1/0057* (2013.01); *H04N 1/32635* (2013.01); *H04N 1/32657* (2013.01); *H04N 1/32667* (2013.01)

(58) Field of Classification Search
None
See application file for complete search history.

(56) References Cited

U.S. PATENT DOCUMENTS

| 8,296,602 | B2 | 10/2012 | Fukuda | |
|---|---|---|---|---|
| 2006/0215196 | A1* | 9/2006 | Someno | B41J 11/0035 358/1.12 |

(Continued)

FOREIGN PATENT DOCUMENTS

| JP | 2007-11426 A | 1/2007 |
|---|---|---|
| JP | 2009-198531 A | 9/2009 |

(Continued)

OTHER PUBLICATIONS

Office Action (Notification of Reasons for Refusal) dated Feb. 17, 2017, by the Japanese Patent Office in corresponding Japanese Patent Application No. 2015-009078, and English translation of Office Action (10 pages).

*Primary Examiner* — Huo Long Chen
(74) *Attorney, Agent, or Firm* — Buchanan Ingersoll & Rooney PC (57) ABSTRACT

An image forming apparatus includes a print engine, a first CPU that controls operation of the image forming apparatus except for the print engine, a second CPU that controls operation of the print engine, and a shared memory. On executing processing of a print job, the first CPU performs a job management including managing job management information and storing the job management information in a data area of the shared memory, and the first CPU outputs image data to be printed, stored in the data area, to the print engine. The second CPU monitors an operation state of the first CPU and, on determining that the abnormality is occurring in the first CPU, maintains the processing of the print job by outputting the image data to be printed to the print engine as proxy for the first CPU and performing the job management as proxy for the first CPU.

16 Claims, 7 Drawing Sheets

(56) References Cited

U.S. PATENT DOCUMENTS

| | | | |
|---|---|---|---|
| 2007/0094459 A1* | 4/2007 | Suzuki | G06F 12/023 711/156 |
| 2011/0051166 A1* | 3/2011 | Nishikawa | G06K 15/00 358/1.13 |
| 2012/0105913 A1* | 5/2012 | Takeichi | G06K 15/408 358/1.16 |
| 2014/0129635 A1* | 5/2014 | Hefty | G06F 13/14 709/204 |

FOREIGN PATENT DOCUMENTS

| | | |
|---|---|---|
| JP | 2012-73748 A | 4/2012 |
| JP | 2012-98788 A | 5/2012 |
| JP | 2013-54314 A | 3/2013 |

\* cited by examiner

IMAGE FORMING APPARATUS, JOB PROCESSING CONTROL METHOD AND NON-TRANSITORY COMPUTER-READABLE STORAGE MEDIUM STORING JOB PROCESSING CONTROL PROGRAM

The entire disclosure of Japanese Patent Application No. 2015-009078 filed on Jan. 21, 2015 including description, claims, drawings, and abstract are incorporated herein by reference in its entirety.

TECHNICAL FIELD

The present invention relates to an image forming apparatus, a job processing control method and a non-transitory computer-readable storage medium storing a job processing control program. Particularly, the present invention relates to an image forming apparatus equipped with plural CPUs; and a method and a non-transitory computer-readable storage medium storing a job processing control program, for controlling processing of a print job in the image forming apparatus.

BACKGROUND

Image forming apparatuses such as MFPs (Multi-Function Peripherals) are generally equipped with plural CPUs (Central Processing Units). One example of a way to use plural CPUs in such apparatuses is that, in a case of an image forming apparatus equipped with two CPUs, one of the CPUs is exclusively assigned to control of the operation of a print engine (including control of printing and drive control of mechanical components of the image forming apparatus) which needs real-time processing at an extremely high level, and the other is assigned to control of the entire operation of the image forming apparatus except for the print engine (including image processing, video output and control of user interface).

In recent years, image forming apparatuses employing plural CPUs which share a bus and a memory are coming into the market. For example, some image forming apparatuses employ a multi-core CPU or a multi-core processor including multiple cores (independent processing units) which are assigned to respective types of control as described above. Such image forming apparatuses have the advantage in cost, because plural cores share a bus and a memory, and further have the advantage in handling abnormalities occurring in the operation so that the apparatuses can easily perform error recovery processing, because each of the cores of the multi-core CPU can monitor the other core easily. For example, in a situation that input of image data into the print engine stops for a certain period of time for some reason, such apparatuses can totally eject a sheet or sheets on which image data was being printed so as not to leave the sheet or sheets inside the body of the print engine.

DESCRIPTION OF THE RELATED ART

As an example of the above-described control of sheet ejection, Japanese Unexamined Patent Publication (JP-A) No. 2009-198531 discloses a paper conveying device for use in an image forming apparatus. The paper conveying device includes an image processing section, a print engine and a controller for fixing a paper jam. The image processing section outputs image data extracted from a print job. The print engine receives the image data from the image processing section, transfers and fixes an image onto a sheet of paper fed and conveyed from a sheet feeding tray and then conveys the sheet to a specified paper-output location. When the print engine does not receive the image data for a predetermined period of time after feeding the sheet begins, the print engine determines that a sheet corresponding to the image data which the print engine fails to receive are jamming and stops conveyance of the sheet. On detecting the jam under the condition that there is no input of the image data to the print engine, the controller for fixing a paper jam fixes the jam in the unit, starts the control to drive the print engine again, and ejects the stopped sheet.

However, with the conventional control of sheet ejection, some problems can be occurred in an image forming apparatus equipped with a CPU for exclusively controlling the operation of a print engine and another CPU for controlling the entire operation of the apparatus, which includes image processing. During the processing of a print job including plural pages, executed by the image forming apparatus, an occurrence of an abnormality in the operation of the CPU for controlling the entire operation can stop or interrupt the input of image data into the print engine. In this situation, the image forming apparatus employing the conventional control of sheet ejection, restarts to drive the print engine and then ejects the sheet the conveyance of which was stopped in the print engine, as it is. It can cause a problem that a defective print is mixed between successfully printed pages. Further, in this situation, a sheet fed from a sheet feeding tray stays in the conveyance path of the apparatus for a certain period of time, which can cause a problem that a curled printed sheet is given after print processing.

SUMMARY

Aspects of the present inventions are directed to image forming apparatuses which can maintain processing of a print job even if an abnormality arises in the operation of a CPU for controlling the entire operation of the apparatus during the processing of the print job, and can prevent a defective print or a curled sheet from mixing into successfully printed sheets; and methods and non-transitory computer-readable storage media each storing a program, for controlling job processing in the image forming apparatuses.

An illustrative image forming apparatus reflecting one aspect of the present invention is an image forming apparatus, comprising: a print engine, a first CPU, a second CPU and a shared memory. The print engine includes a sheet feeding unit and a sheet ejecting unit, and prints image data onto a sheet of paper, while conveying the sheet from the sheet feeding unit to the sheet ejecting unit. The first CPU controls operation of the image forming apparatus except for the print engine, and the second CPU controls operation of the print engine. The shared memory includes a data area to which the first CPU and the second CPU can access. On executing processing of a print job, the first CPU performs a job management and outputs image data to be printed, stored in the data area, to the print engine. The job management includes managing job management information and storing the job management information in the data area of the shared memory, where the job management information includes setup values about the print job and progress of the print job. The second CPU monitors an operation state of the first CPU, and determines whether an abnormality interrupting the job management and the outputting the image data is occurring in the first CPU. On determining that the abnormality is occurring in the operation of the first CPU, the second CPU maintains the processing of the print job, where the maintaining the processing includes outputting the image data to be printed, stored in the data area, to the print engine on a basis of the job management information stored in the data area, as proxy for the first CPU, and performing the job management on the job management information stored in the data area, as proxy for the first CPU.

An illustrative method reflecting one aspect of the present invention is a method of controlling job processing in an image forming apparatus. The image forming apparatus includes a print engine that prints image data onto a sheet of paper, while conveying the sheet from a sheet feeding unit to a sheet ejecting unit, a first CPU that controls operation of the image forming apparatus except for the print engine, a second CPU that controls operation of the print engine, and a shared memory including a data area to which the first CPU and the second CPU can access. The method comprises, on executing processing of a print job, causing the first CPU to perform the following processing. The processing includes performing a job management including managing job management information and storing the job management information in the data area of the shared memory, where the job management information includes setup values about the print job and progress of the print job. The processing further includes outputting image data to be printed, stored in the data area, to the print engine. The method further comprises causing the second CPU to perform the following processing. The processing includes monitoring an operation state of the first CPU, determining whether an abnormality interrupting the job management and the outputting the image data is occurring in the first CPU, and maintaining the processing of the print job, on determining that the abnormality is occurring in the operation of the first CPU. The maintaining the processing includes outputting the image data to be printed, stored in the data area, to the print engine on a basis of the job management information stored in the data area, as proxy for the first CPU and performing the job management on the job management information stored in the data area, as proxy for the first CPU.

An illustrative non-transitory computer-readable storage medium reflecting one aspect of the present invention stores a program for controlling job processing in an image forming apparatus. The image forming apparatus includes a print engine that prints image data onto a sheet of paper, while conveying the sheet from a sheet feeding unit to a sheet ejecting unit, a first CPU that controls operation of the image forming apparatus except for the print engine, a second CPU that controls operation of the print engine, and a shared memory including a data area to which the first CPU and the second CPU can access. On executing processing of a print job, the first CPU performs a job management and outputs image data to be printed, stored in the data area, to the print engine, there the job management includes managing job management information, and storing the job management information in the data area of the shared memory, where the job management information includes setup values about the print job and progress of the print job. The program causes the second CPU to perform processing comprising: monitoring an operation state of the first CPU, determining whether an abnormality interrupting the job management and the outputting the image data is occurring in the first CPU, and maintaining the processing of the print job, on determining that the abnormality is occurring in the operation of the first CPU. The maintaining the processing includes outputting the image data to be printed, stored in the data area, to the print engine on a basis of the job management information stored in the data area, as proxy for the first CPU and performing the job management on the job management information stored in the data area, as proxy for the first CPU.

Other features of illustrative embodiments will be described below.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

According to image forming apparatuses, job processing control methods and non-transitory computer-readable storage media each storing a job processing control program as embodiments of the present invention, even under the condition that an abnormality is occurring in the operation of the CPU for controlling the entire operation of the apparatus during the processing of a print job, the processing of the print job can be maintained and a defective print and/or curled sheet can be prevented from mixing into successfully printed pages, for the following reason.

An illustrative image forming apparatus includes a print engine, a first CPU that controls the operation of the apparatus other than the print engine, a second CPU that control the operation of the print engine, and a shared memory in which the first CPU and the second CPU can share a data area. The second CPU (when executing a job processing control program) monitors the operation state of the first CPU, and on determining that an abnormality is occurring in the operation of the first CPU, the second CPU maintains the processing of the print job by obtaining, from the shared memory, image data to be printed, stored in the data area of the shared memory, and outputting the image data to the print engine as proxy for the first CPU. Optionally, the second CPU may instruct the print engine to reduce print speed, such as speed of the print engine at conveying sheets, speed of the print engine at transferring images on sheets, and speed of the print engine at fixing images on sheets, so as to bring the operation of the second CPU into the condition that the second CPU can execute the above-described control as proxy for the first CPU.

As described in the above, in recent years, there are provided image forming apparatuses are equipped with plural CPUs. One example of a way to use plural CPUs in such apparatuses is that, in a case of an image forming apparatus equipped with two CPUs, one of the CPUs is exclusively assigned to control of the operation of a print engine which needs real-time processing at an extremely high level, and the other is assigned to control of the entire operation (including image processing) of the image forming apparatus except for the print engine. As an example, it is considered a situation that, during the processing of a print job including plural pages, executed by the image forming apparatus having the above structure, an occurrence of an abnormality in the operation of the CPU for controlling the entire operation stops or interrupts the image processing and thereby an input of image data to a print engine is interrupted. In this situation, an image forming apparatus employing the conventional control of sheet ejection stops conveyance of a sheet of paper and restarts to drive the print engine to eject the sheet inside the print engine. It can cause problems that a defective print is mixed into printed pages and that a curled sheet is ejected.

To solve these problems, a method to cause one of CPUs to act as proxy for the other CPU can be considered. However, in an apparatus, like an image forming apparatus, including mechanical components having the complicated structure, the control to be executed by a CPU for controlling the operation of a print engine greatly differs from the control to be executed by the other CPU for controlling the entire operation of the apparatus. Further, the CPU for controlling the operation of the print engine is requested to drive a great number of mechanical components of the print engine with being adjusted to each other, which needs the CPU to have great processing power. Therefore, in the situation that an abnormality arises in the operation of the CPU for controlling the entire operation of the apparatus and an input of the image data to the print engine has been interrupted, it is difficult for the CPU for controlling the print engine to execute all the control to be executed by the other CPU for controlling the whole operation, as proxy for the other CPU.

In view of that, in an image forming apparatus as an embodiment reflecting one aspect of the present invention, when an abnormality arises in the operation of the first CPU for controlling the entire operation of the apparatus, the second CPU for controlling the operation of the print engine is caused to execute a part of the control to be executed by the first CPU, which includes a job management (creating or updating job management information and storing the job management information in the shared memory) and output of image data stored in the shared memory to the print engine, as proxy for the first CPU, so as to maintain the processing of a print job which is now being executed. Optionally, the second CPU may be caused to temporally reduce the print speed of the print engine (such as the speed at conveying sheets, the speed at transferring images on sheets and the speed at fixing images on sheets) to bring the operation of the second CPU into the condition that the second CPU can execute additional control as proxy for the first CPU, so that the second CPU can surely execute the control as proxy for the first CPU.

With this control, even under the condition that an abnormality is occurring in the operation of the CPU for controlling the entire operation of the apparatus during the processing of a print job in the image forming apparatus, the image forming apparatus can maintain the processing of the print job and prevents a defective print and/or curled sheet from mixing into successfully printed pages.

EXAMPLE

Figure 1:
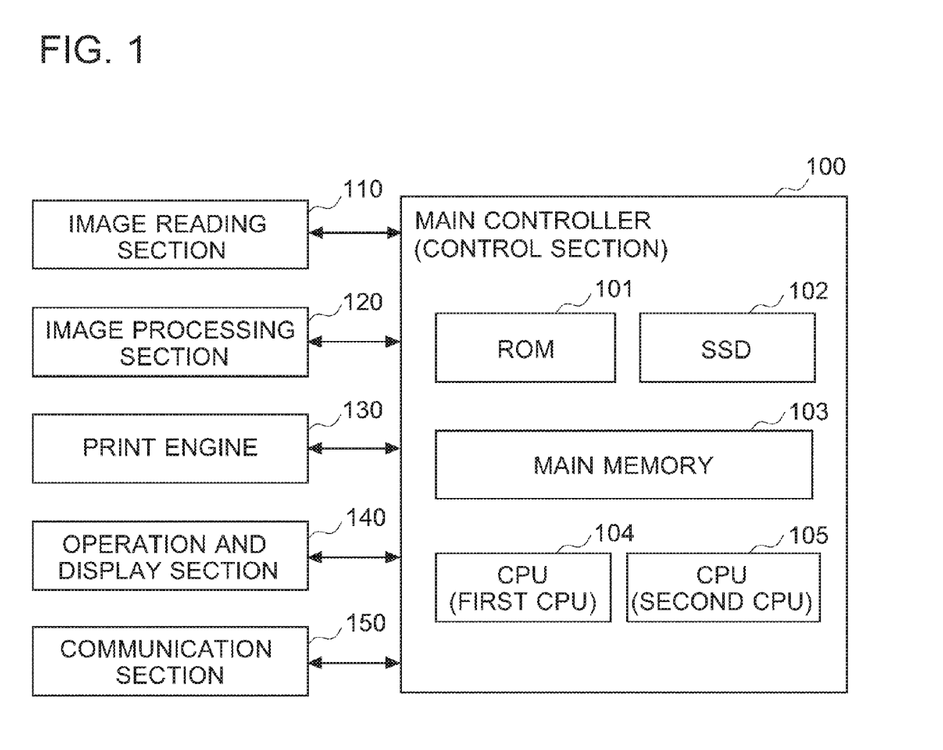
FIG. 1 is a block diagram schematically illustrating an example of the structure of an image forming apparatus as an embodiment of the present invention.
Figure 2:
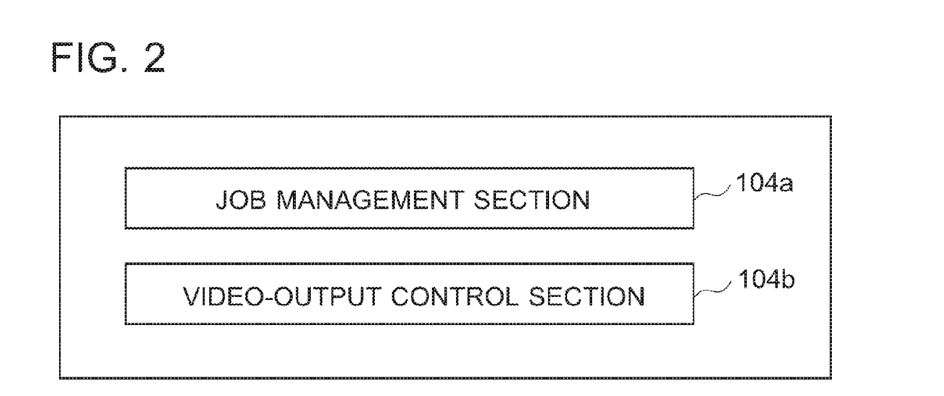
FIG. 2 is a block diagram schematically illustrating an example of functions activated by a first CPU (a CPU for controlling the entire operation of the apparatus, including image processing) of the image forming apparatus as an embodiment of the present invention.
Figure 3:
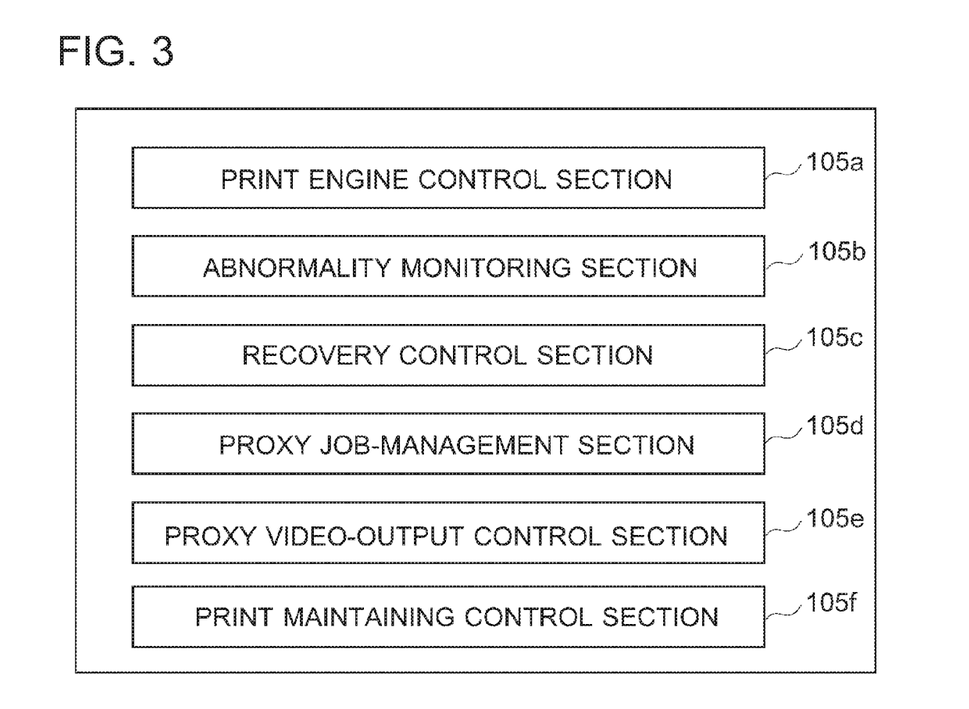
FIG. 3 is a block diagram schematically illustrating an example of functions activated by a second CPU (a CPU for exclusively controlling the operation of an print engine) of the image forming apparatus as an embodiment of the present invention.
Figure 4:
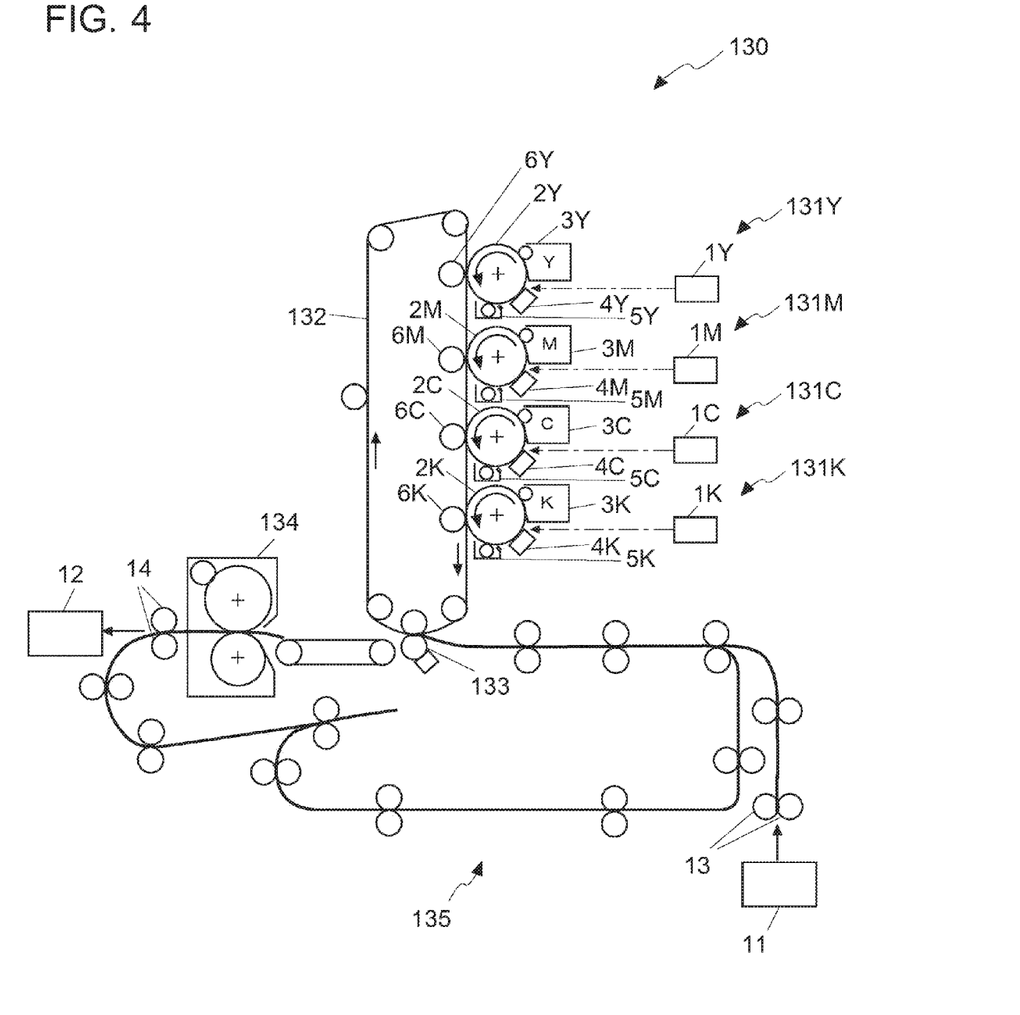
FIG. 4 is a diagram schematically illustrating an example of the structure of a print engine of the image forming apparatus as an embodiment of the present invention.
Figure 5:
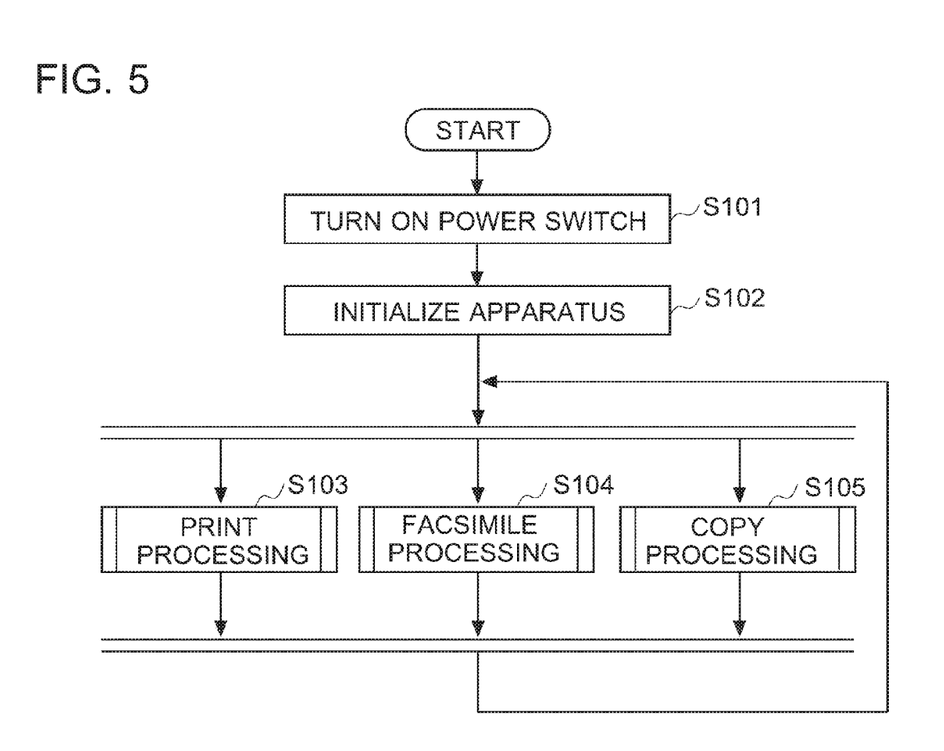
FIG. 5 is a flowchart illustrating an example of the operation (the entire operation) of the image forming apparatus as an embodiment of the present invention.
Figure 6:
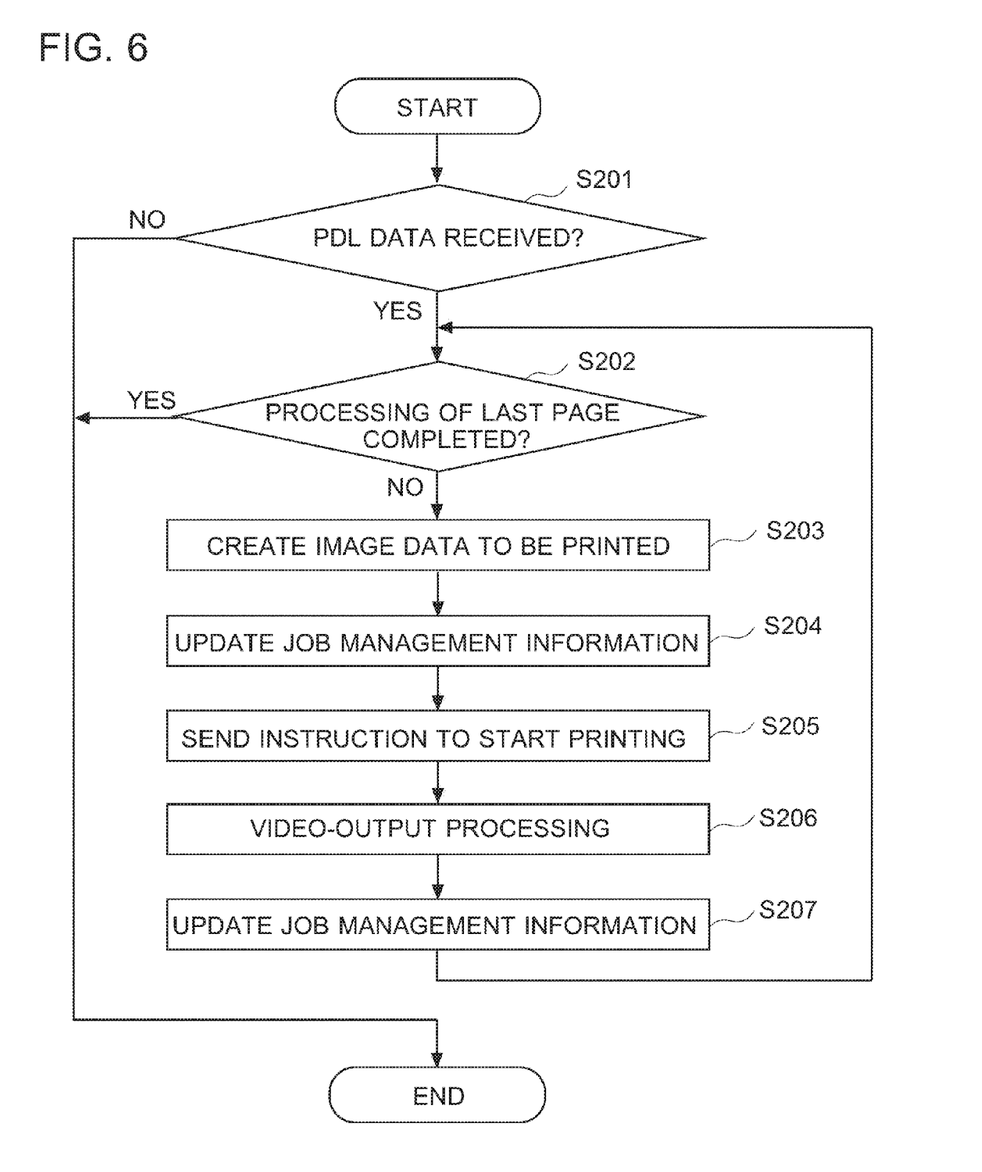
FIG. 6 is a flowchart illustrating an example of the operation of the first CPU of the image forming apparatus as an embodiment of the present invention.
Figure 7:
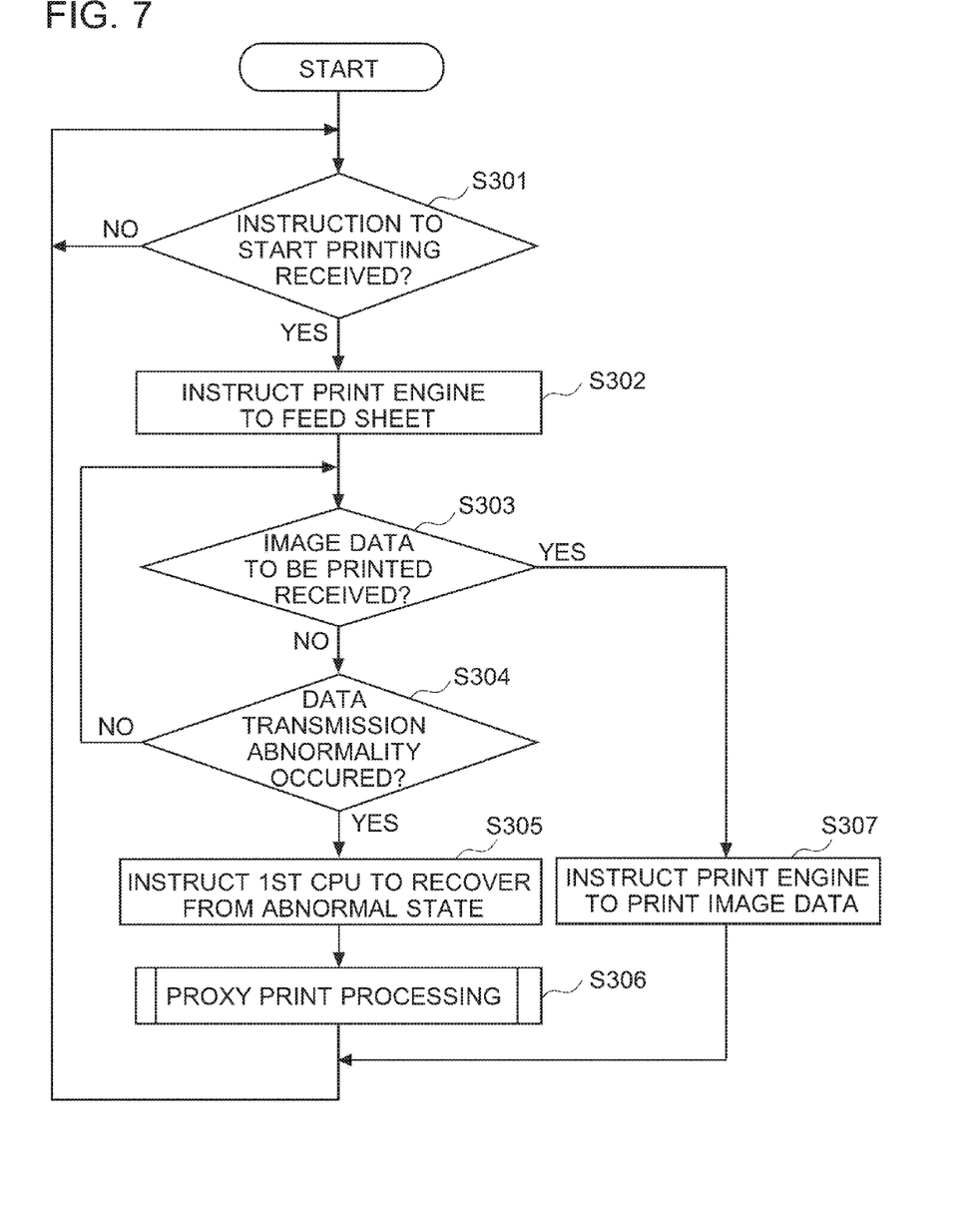
FIG. 7 is a flowchart illustrating an example of the operation of the second CPU of the image forming apparatus as an embodiment of the present invention.
Figure 8:
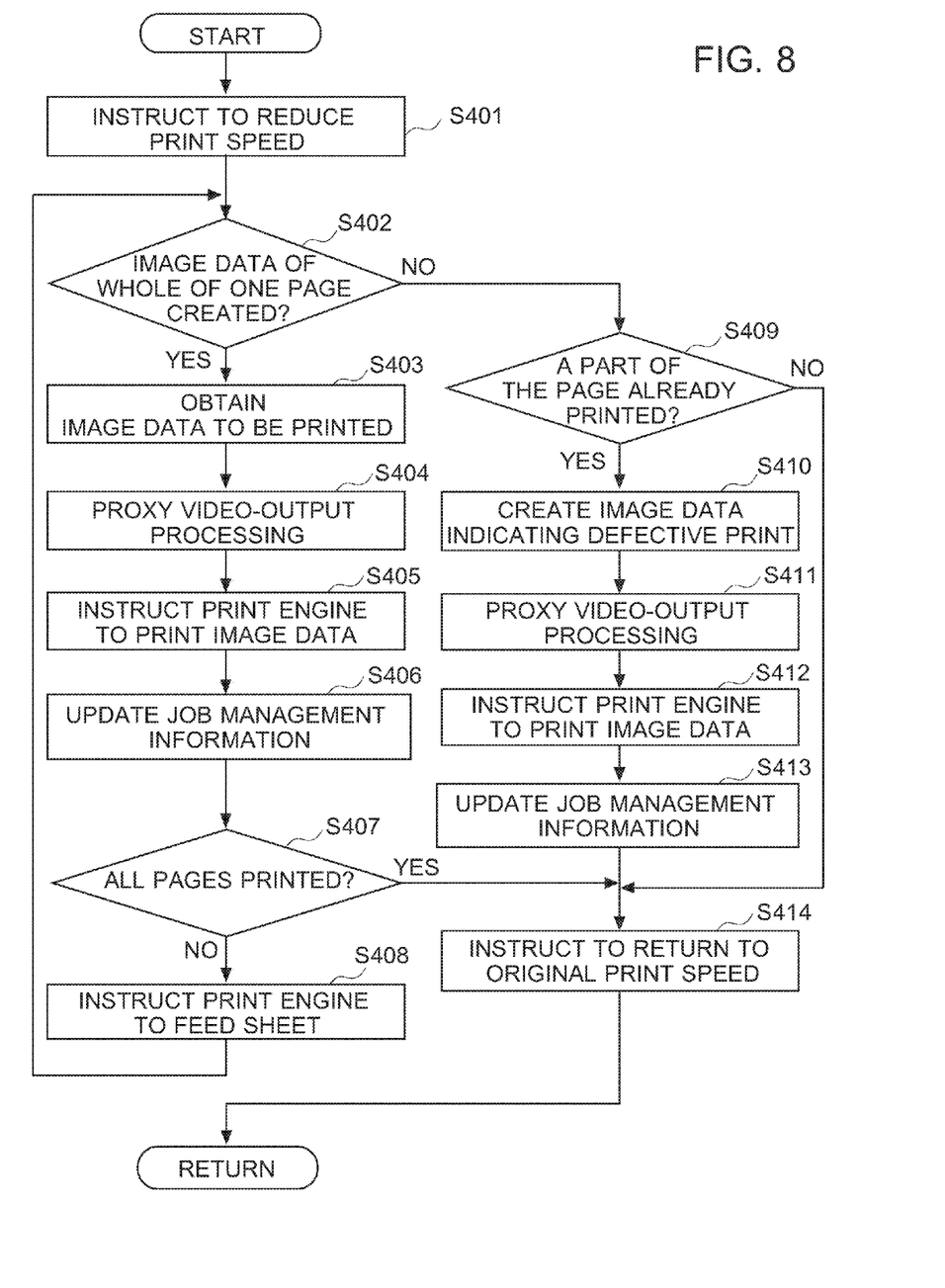
FIG. 8 is a flowchart illustrating an example of the operation (proxy print processing) of the second CPU of the image forming apparatus as an embodiment of the present invention.

An example of the image forming apparatus, job processing control method and non-transitory computer-readable storage medium storing a job processing control program will be described with reference to FIGS. 1 to 8 so as to describe the above-described embodiments in detail. FIG. 1 is a block diagram schematically illustrating an example of the structure of an image forming apparatus of the present example. Each of FIG. 2 and FIG. 3 is a block diagram schematically illustrating an example of functions activated by a CPU of the image forming apparatus. FIG. 4 is a diagram schematically illustrating an example of the structure of a print engine of the image forming apparatus. FIG. 5 is a flowchart illustrating an example of the operation of the image forming apparatus. Each of FIGS. 6 to 8 is a flowchart illustrating an example of the operation of a CPU of the image forming apparatus.

The image forming apparatus of the present example includes main controller (control section) 100, image reading section 110, image processing section 120, print engine 130, operation and display section 140 and communication section 150, as illustrated in FIG. 1.

Main controller (control section) 100 includes ROM (Read Only Memory) 101, SSD (Solid State Drive) 102, main memory (shared memory) 103, CPU (first CPU) 104 and CPU (second CPU) 105. The CPU 104 and CPU 105, when loading programs stored in ROM 101 or SSD 102 onto main memory 103 and executing the programs, receive user's operations through operation and display section 140 and executes predetermined control on image reading section 110, image processing section 120, print engine 130, operation and display section 140 and communication section 150. Each of the CPU 104 and CPU 105 can access to a common data area (hereinafter, referred to as a specific data area) in the main memory 103. CPU 105 mainly controls the operation of print engine 130, and CPU 104 controls the other operation, which includes image processing section 120, of the image forming apparatus (in other words, controls the operation of the image forming apparatus except for print engine 130).

In concrete terms, CPU 104 (first CPU) works as job management section 104a and video-output control section 104b, on executing processing of a print job, as illustrated in FIG. 2.

Job management section 104a manages (creates or updates) job management information which includes information about a print job (for example, setup values about a print job and progress of the print job), and stores the job management information in the specific data area of main memory 103.

Video-output control section 104b reads image data to be printed which was generated by image processing section 120 which will be described below and was stored into the specific data area of main memory 103, and outputs the image data successively (also referred to as video output) to print engine 130.

CPU 105 (second CPU), when executing a job processing control program, works as print engine control section 105a, abnormality monitoring section 105b, recovery control section 105c, proxy job-management section 105d, proxy video-output control section 105e, and print maintaining control section 105f, as illustrated in FIG. 3. In other words, the job processing control program, when being executed, causes the CPU 105 to perform processing of those sections.

Print engine control section 105a gives print engine 130 instructions to convey a sheet of paper, transfer an image onto a sheet of paper and fix the image onto a sheet of paper.

Abnormality monitoring section 105b monitors the operation state of CPU 104 and determines whether an abnormality has occurred in the operation of the first CPU and the first CPU is in the state that the processing of the job management section 104a and the video-output control section 105b as CPU 104 is stopped or interrupted (which includes the state that a process which was running on a low-level software program running on CPU 104, such as operating system and a program provided from firmware, hangs or is in out of control state). Abnormality monitoring section 105b sends information about the determination result to recovery control section 105c, proxy job-management section 105d, proxy video-output control section 105e and print maintaining control section 105f. An occurrence of an abnormality in the operation of CPU 104 can be determined, for example, by using a timer (watchdog timer) which is prepared as a program or hardware running on/with CPU 104 so as to be reset by instructions at certain intervals, and by checking whether the timer has actually been reset.

Recovery control section 105c, when abnormality monitoring section 105b has determined that an abnormality is occurring in the operation of CPU 104, performs control to make the operation of the CPU 104 recover from the abnormal state. For example, recover control section 105c may give CPU 104 (or a low-level software program like firmware running on CPU 104) a restart instruction or an instruction to forcibly release a memory (for example, to delete data stored in main memory 103 and handled by CPU 104). A restart instruction to CPU 104 means processing to reset the CPU 104 to the initial state and start the CPU 104, and examples of the restart instruction includes processing to cut off the power supplied to CPU 104 for a short time and then supply the power to the CPU 104 again; and processing to stop execution of a low-level software programs running on CPU 104, such as the above-described firmware, for a short time and then execute the low-level software programs again. In response to detecting that CPU 104 has recovered from the abnormal state (for example, detecting that a watchdog timer has been reset), recovery control section 105c instructs job management section 104a as CPU 104 to start the processing of the print job on the basis of job management information updated by proxy job-management section 105d as CPU 105.

Proxy job-management section 105d, when abnormality monitoring section 105b has determined that an abnormality is occurring in the operation of CPU 104, performs a job management on the job management information stored in the main memory 103 (which includes creating or updates the job management information, and storing the job management information in the specific data area of main memory 103). In other words, proxy job-management section 105d acts as proxy for job management section 104a (CPU 104). If the whole of one page of image data is not stored in the specific data area of main memory 103 and a part of the page has already been printed, proxy job-management section 105d creates image data representing that the page is a defective print (for example, image data of words 'defective print' covering all of one page or image data of a cross or slash mark covering all of one page).

Proxy video-output control section 105e, when abnormality monitoring section 105b has determined that an abnormality is occurring in the operation of CPU 104, outputs image data to be printed, which was stored in the specific data area of main memory 103, to print engine 130 in accordance with instructions given by print maintaining control section 105f. In other words, proxy video-output control section 105e acts as proxy for video-output control section 104b (CPU 104).

Print maintaining control section 105f, when abnormality monitoring section 105b has determined that an abnormality is occurring in the operation in CPU 104, maintains the processing of the print job by giving proxy video-output control section 105e instructions to output image data to be printed on the basis of the job management information managed (updated) by the proxy job-management section 105d. Further, print maintaining control section 105f, when abnormality monitoring section 105b has determined that an abnormality is occurring in the operation in CPU 104, gives print engine control section 105a instructions to reduce the print speed of print engine 130 (such as the speed at conveying sheets, speed at transferring images on sheets, and speed at fixing images on sheets), in concrete terms, instructions to reduce at least one of the above-described speeds so as to avoid mismatch between the operations of the components of print engine 130. Print maintaining control section 105f, when abnormality monitoring section 105b has determined that CPU 104 has recovered from the abnormal state, gives print engine control section 105a instructions to return the reduced print speed (such as the speed of print engine 130 at conveying sheets, the speed of print engine 130 at transferring images on sheets and the speed of print engine 130 at fixing images on sheets) to the original speed.

As illustrated in FIG. 1, image reading section 110, image processing section 120, print engine 130, operation and display section 140 and communication section 150 carry out functions of an image forming apparatus.

In concrete terms, image reading section 110 is a part which optically reads an image from an original loaded on an original glass or glass platen of the image forming apparatus. The image reading section 110 includes a light source to be used to scan the original, an image sensor like a CCD (Charge Coupled Device) which converts light reflected on the original into electrical signals, and an A/D converter which carries out A/D conversion by using the electric signals. The image reading section 110 is controlled by CPU 104 to output the image data captured from the original to main controller 100.

Image processing section 120 is controlled by CPU 104 to perform image processing, such as edge enhancement, smoothing and color conversion, on the image data of the original captured by image reading section 110. On receiving print data in PDL (Page Description Language), as exemplified in PostScript and PCL (Printer Control Language) from another apparatus, image processing section 120 rasterizes pages contained in the print data to create image data of the each page, and performs the above-described image processing on the image data of each page. Then, image processing section 120 stores the processed image data (image data to be printed) in the specific data area of main memory 103.

Print engine 130 is controlled by CPU 105 to receive the image data to be printed, on which image processing section 120 performed image processing, and print the image data on a sheet of paper while conveying the sheet. FIG. 4 illustrates an example of the actual structure of print engine 130. The print engine 130 includes image forming units 131Y, 131M, 131C, 131K, intermediate transfer belt 132, second transfer roller 133, fixing unit 134 and conveyance unit 135. Image forming units 131Y, 131M, 131C, 131K each forms an image of toner in one of Y, M, C and K colors on intermediate transfer belt 132, and include exposure units 1Y, 1M, 1C, 1K, photoreceptor drums 2Y, 2M, 2C, 2K, developing units 3Y, 3M, 3C, 3K, charging units 4Y, 4M, 4C, 4K, photoreceptor cleaning unit 5Y, 5M, 5C, 5K, and first transfer rollers 6Y, 6M, 6C, 6K. Exposure units 1Y, 1M, 1C, 1K perform an exposure process by irradiating respective photoreceptor drums 2Y 2M, 2C, 2K, which were charged by charging units 4Y, 4M, 4C, 4K, with laser light in accordance with a page image, to form latent images. Developing units 3Y, 3M, 3C, 3K develop the latent images by using Y, M, C and K toners, and the image made of Y, M, C and K toners is put on the intermediate transfer belt 132 by using first transfer rollers 6Y, 6M, 6C, 6K. Intermediate transfer belt 132, which is driven by rollers, works as an intermediate transfer body and conveys the image of toners formed by image forming units 131Y, 131M, 131C, 131K to a sheet of paper. Second transfer belt 132 transfers the image of toners on intermediate transfer belt 132 onto a sheet of paper, and fixing unit 134 fixes the image on the sheet. Conveyance unit 135 includes sheet feeding unit 11, sheet ejecting unit 12 and rollers including sheet feeding rollers 13, sheet ejecting rollers 14 and other rollers, for conveying sheets of paper from sheet feeding unit 11 to sheet ejecting unit 12.

Operation and display section 140 includes a touch screen and hardware keys. The touch screen includes a display unit such as a LCD (Liquid Crystal display); and an operations unit, such as a touch sensor, which includes electrodes arranged in a lattice shape put on the display unit. Operation and display section 140 is controlled by CPU 104 to present a user an operation screen of the image forming apparatus, receive user's operations and output signals corresponding to the user's operations to main controller 100.

Communication section 150 includes a communication device, such as a NIC (Network Interface Card) and a modem, for establishing communication with a LAN (Local Area Network). Communication section 150 is controlled by CPU 104, and thereby becomes communicable with a computing device connected to the image forming apparatus through the local area network.

In the present example, description was given to the structure of a MFP as an example of an image forming apparatus, and the illustrative MFP includes image reading section 110, image processing section 120 and others. However, it should be noted that the described components are not essential to the image forming apparatus reflecting an aspect of the present invention, and other kinds of apparatus, such as a mono-functional printer which does not include image reading section 110 and a facsimile machine equipped with communication function using telephone infrastructure, can be the image forming apparatus. Further, FIG. 1 illustrates the structure that CPU 104 and CPU 105 are provided as separated bodies. Alternatively, the image forming apparatus may employ a single multi-core CPU (processor) including two or more cores as independent processing units.

Hereinafter, description is given to the operation of the image forming apparatus of the present example, with reference to FIGS. 5 to 8.

Entire Operation of the Apparatus:

CPU 104 and CPU 105 in main controller 100 load programs stored in ROM 101 or SSD 102 onto maim memory 103 and execute the programs, to cause the main controller to perform processing of the steps shown in flowcharts of FIG. 5.

First, when a user turns on a power switch of the image forming apparatus and power is supplied to the image forming apparatus (S101), main controller 100 (CPU 104 and CPU 105) initializes the apparatus (S102). When completing the initializing process, main controller 100 (CPU 104) controls operation and display section 140 to display a user-interface screen so as to allow a user to operate the image forming apparatus. Then, main controller 100 (CPU 104 and CPU 105) activates functions of the image forming apparatus in accordance with user's requests. For example, controller 100 (CPU 104 and CPU 105) may perform print processing (S103), facsimile processing (S104) or copy processing (S105). Controller 100 (CPU 104 and CPU 105) can perform two or more kinds of processing simultaneously, and the CPUs work complexly to provides users the functions. Hereinafter, description is given to the print processing but the facsimile processing and the copy processing should be performed similarly.

Print Processing 1:

CPU 104 loads programs stored in ROM 101 or SSD 102 on main memory 103 and executes the programs, and thereby performs the steps of the print processing (S103 in FIG. 5) illustrated in the flowchart of FIG. 6, to execute processing of a print job.

First, CPU 104 determines whether communication section 150 has received PDL data through an external network (S201). If determining that communication section 150 has not received PDL data, the print processing is terminated.

If determining that communication section 150 has received PDL data, CPU 104 determines whether processing of the last page has been completed (S202). If processing of the last page has been completed, the print processing is terminated. If processing of the last page has not been completed, CPU 104 controls image processing section 120 and causes the image processing section 120 to create image data to be printed, on the basis of received PDL data, and store the created image data to be printed into the specific data area of main memory 103 (S203). CPU 104 (job management section 104a) creates or updates job management information including information about progress of the print job up to the present (for example, the number of pages for which image data have been created), and stores the resulting job management information in the specific data area of main memory 103 (S204).

Next, CPU 104 send CPU 105 instructions to start printing (S205) and CPU 104 (video-output control section 104b) outputs print engine 130 the image data to be printed which was created by image processing section 120 and stored in the specific data area of main memory 103 (S206). CPU 104 (job management section 104a) creates or updates job management information including progress of the print job up to the present (for example, the number of pages which have been printed or ejected), and stores the resulting job management information in the specific data area of main memory 103 (S207). Then, returning to S202, CPU 104 determines whether processing of the last page has been completed.

Proxy Print Processing 2:

CPU 105 loads a job processing control program stored in ROM 101 or SSD 102 onto main memory 103 and executes the program, and thereby performs the steps of the print processing (S103 in FIG. 5) illustrated in the flowchart of FIG. 7.

First, CPU 105 determines whether CPU 105 has received the instructions to start printing sent from CPU 104 in S205 in the flowchart of FIG. 6 (S301). If determining that CPU 105 has not received the instructions to start printing, CPU 105 continues determining whether CPU 105 has received the instructions to start printing from CPU 104. If determining that communication section 150 has received the instructions to start printing, CPU 105 (print engine control section 105*a*) gives print engine 130 instructions to feed a sheet of paper (S302).

Next, CPU 105 monitors whether print engine 130 receives input of image data to be printed, sent from CPU 104 (S303). If print engine 130 is receiving the input of image data to be printed, CPU 105 (print engine control section 105*a*) gives print engine 130 instructions to perform printing (S307), and returns to the standby state of instructions to start printing. If there is no input of image data to be printed, CPU 105 (abnormality monitoring section 105*b*) determines whether an abnormality is occurring in the operation of CPU 104 by using a watchdog timer (S304). If no abnormality occurs in the operation of CPU 104, CPU 105 returns to S303 and goes on standby of input of image data to be printed.

If determining that an abnormality is occurring in the operation of CPU 104, CPU 105 (recovery control section 105*c*) requests CPU 104 to recover from an abnormal state as the need arises (S305). As a request to recover from an abnormal state, CPU 105 may send CPU 104 a restart instruction or make a recovery of CPU 104 by using an appropriate action according to the abnormal state. For example, under the condition that the processing of a print job stops with failing to output the image data to be printed because of a lack of available space of main memory 103, CPU 105 (recovery control section 105*c*) may instruct CPU 104 to forcibly release the main memory 103. Then, CPU 105 maintains or continues the processing of the print job by performing proxy print processing (S306), and then returns to S301 to go on standby to receive instructions to start printing.

If CPU 105 (recovery control section 105*c*) has detected that CPU 104 recovers from an abnormal state, during the proxy print processing or after a completion of the proxy print processing, CPU 105 (recovery control section 105*c*) gives CPU 104 (job management section 104*a*) instructions to execute the processing of the print job on the basis of job management information updated by CPU 105 (proxy job-management section 105*d*), to cause CPU 104 to start the processing of the print job.

Proxy Print Processing:

CPU 105 loads programs stored in ROM 101 or SSD 102 onto main memory 103 and executes the programs, and thereby performs the steps of the proxy print processing (S306 in FIG. 7) illustrated in the flowchart of FIG. 8.

First, CPU 105 (print maintaining control section 1050 gives CPU 105 (print engine control section 105*a*) instructions to reduce print speed of print engine 130 (at least one of the speed at conveying sheets, speed at transferring images on sheets and speed at fixing images on sheets) (S401). According to the instructions, CPU 105 (print engine control section 105*a*) reduces the print speed of print engine 130. Next, CPU 105 (proxy job-management section 105*d*) determines whether creation of one page of image data has been completed (or whole of one page of image data is stored in the specific data area of main memory 103) on the basis of job management information stored in the specific data area of main memory 103 (S402).

If creation of the one page of image data has been completed (YES in S402), CPU 105 (proxy video-output section 105*e*) obtains image data to be printed from the specific data area of main memory 103 (S403), and outputs the image data to print engine 130 as proxy for CPU 104 (video-output control section 104*b*) (S404). Then, on the basis of the job management information stored in the specific data area of main memory 103, CPU 105 (print engine control section 105*a*) gives print engine 130 instructions to perform printing (S405). After completing the printing, CPU 105 (proxy job-management section 105*d*) updates the job management information including progress of the print job (for example, the number of pages on which processing of the print job has been completed) (S406).

Next, CPU 105 (proxy job-management section 105*d*) determines whether all of the pages of the print job have been printed on the basis of the job management information about the print job (S407). If all the pages of the print job have not been printed, CPU 105 (print engine control section 105*a*) gives print engine 130 instructions to feed a new sheet of paper (S408), returns to S402 and performs printing on the next page. If all the pages of the print job have been printed, CPU 105 (print maintaining control section 1050 gives CPU 105 (print engine control section 105*a*) instructions to return the print speed (such as speed at conveying sheets, speed at transferring images on sheets and speed at fixing images on sheets) the original setting (S415), and CPU 105 (print engine control section 105*a*) returns the print speed of print engine 130 to the original setting according to the received instructions, and terminates the proxy print processing.

If in S402, creation of the one page of the image data has not been completed (NO in S402), CPU 105 (proxy job-management section 105*d*) determines whether a part of the page, which is currently processed to be printed, has already been printed (S409). If none of the page has been printed, CPU 105 (print maintaining control section 1050 gives instructions to return the print speed (such as the speed at conveying sheets, speed at transferring images on sheets and speed at fixing images on sheets) to the original setting (S414), and CPU 105 (print engine control section 105*a*) returns the print speed of print engine 130 to the original setting according to the received instructions, and terminates the proxy print processing.

If a part of the page concerned has already been printed, CPU 105 (proxy job-management section 105*d*) determines that printing on a sheet stops (is interrupted) in the middle and creates image data indicating defective print (S410). It is preferable that the image data indicating defective print, represents explicitly an occurrence of print defects such that a user can understand the occurrence of print defects easily. For example, image data of words 'defective print' covering all of the printable area (of a sheet) may be created or image data of a cross or slash mark covering all of the printable area (of a sheet) may be created. Next, CPU 105 (proxy video-output control section 105*e*) outputs print engine 130 the created image data representing defective print (S411) and gives print engine 130 instructions to perform printing (S412).

Then, CPU 105 (proxy job-management section 105*d*) stores job management information including information about progress of the print job up to the present into the specific data area of main memory 103 (S413). CPU 105 (print maintaining control section 105*0* gives CPU 105 (print engine control section 105*a*) instructions to return the print speed (for example, the speed at conveying sheets, speed at transferring images on sheets and speed at fixing images on sheets) of print engine 130 to the original speed (S414). CPU 105 (print engine control section 105*a*) returns the print speed of print engine 130 to the original speed according to the received instructions and terminates the proxy print processing.

In the above-described flow, CPU 105 reduces the print speed of print engine 130 in the proxy print processing. However, as far as CPU 105 can successfully perform the proxy print processing without the print speed of print engine 130 being reduced (CPU 105 can afford to perform the proxy print processing), the processing of reducing the print speed at S401 and the processing of recovering the print speed at S414 may be omitted.

As described above, the image forming apparatus employs the job processing control such that CPU 105 maintains current processing of a print job by performing a part of control to be performed by CPU 104, as proxy for the CPU 104. The part of control to be performed by CPU 104 includes a job management performed on the job management information in the specific data area of main memory 103 (which includes creating/updating job management information and storing the job management information in the specific data area of main memory 103) and output of image data stored in the specific data area to print engine 130. Such control can prevent a distorted sheet or a defective print from mixing into printed sheets. Further, temporal reduction of the print speed (such as the speed at conveying sheets, speed at transferring images on sheets and speed at fixing images on sheets) allows CPU 105 to surely and successfully perform a part of the control to be performed by CPU 104, as proxy for CPU 104.

The above description was given to print processing but similar control may be applied to facsimile processing and copy processing. For example of facsimile processing, the image forming apparatus may further include a facsimile control section and perform the following processing. In accordance with the control by CPU 104, the facsimile control section receives facsimile data at S201 in the flowchart of FIG. 6, and image processing section 120 performs image processing on the received facsimile data to create image data to be printed. For another example of copy processing, the image forming apparatus may perform the following processing. In accordance with the control by CPU 104, image reading section 110 reads an original and obtains image data at S201 in the flowchart of FIG. 6, and image processing section 120 performs image processing on the obtained image data to create image data to be printed.

Incidentally, the present invention should not be limited to the above-mentioned embodiments and examples and unless deviating from the intention of the present invention, the constitution of the image forming apparatus and the method of controlling job processing of the apparatus may be changed appropriately.

For example, in the above-described example, description was given to the image forming apparatus equipped with two CPU of CPU 104 and CPU 105. However, the control of job processing in the example is applicable to other types of image forming apparatus which includes one or plural CPU for controlling the entire operation of the apparatus except for print engine 130, additionally to CPU 105 for controlling print engine 130.

Further, in the above example, an image forming apparatus was illustrated as an example of an apparatus to be controlled. However, the above-described job processing control is applicable to arbitrary apparatuses each of which includes machinery having many mechanical components, a CPU configured to control to drive the machinery, and another CPU configured to control the entire operation of the apparatus except for the machinery.

The embodiments and examples of the present invention are applicable to image forming apparatuses each equipped with plural CPUs, job processing control methods for controlling processing of a job in such image forming apparatus and non-transitory computer-readable media each storing a program of controlling a print job with such a method.

Although embodiments and examples of the present invention has been described and illustrated in detail, it is clearly understood that the same is by way of illustrated and example only and is not to be taken by way of limitation, the scope of the present invention being interpreted by terms of the appended claims.

The invention claimed is:

1. An image forming apparatus, comprising:
    a print engine that includes a sheet feeding unit and a sheet ejecting unit, and prints image data onto a sheet of paper, while conveying the sheet from the sheet feeding unit to the sheet ejecting unit;
    a first CPU that controls operation of the image forming apparatus except for the print engine;
    a second CPU that controls operation of the print engine; and
    a shared memory including a data area to which the first CPU and the second CPU can access,
    wherein the first CPU, on executing processing of a print job, performs a job management including managing job management information, the job management information including setup values about the print job and progress of the print job, and
    storing the job management information in the data area of the shared memory, and outputs image data to be printed, stored in the data area, to the print engine, and
    wherein the second CPU monitors an operation state of the first CPU,
    determines whether an abnormality is occurring in the operation of the first CPU, the abnormality interrupting the job management and the outputting the image data, and
    maintains the processing of the print job, on determining that the abnormality is occurring in the operation of the first CPU,
    the maintaining the processing including outputting the image data to be printed, stored in the data area, to the print engine on a basis of the job management information stored in the data area, as proxy for the first CPU and performing the job management on the job management information stored in the data area, as proxy for the first CPU,
    wherein, on maintaining the processing of the print job, the second CPU gives the print engine an instruction to reduce at least one of speed of the print engine at conveying sheets, speed of the print engine at transferring images on sheets, and speed of the print engine at fixing images on sheets, in response to determining that the abnormality is occurring in the operation of the first CPU, and wherein the second CPU gives a second instruction to return the print engine to normal speed when the print job is completed or when no part of one page, which is currently processed to be printed, of the image data has already been created.

2. The image forming apparatus of claim 1, wherein the second CPU makes the first CPU recover from an abnormal state, on determining that the abnormality is occurring in the operation of the first CPU.

3. The image forming apparatus of claim 2, wherein, on making the first CPU recover, the second CPU gives the first CPU an instruction to release the shared memory.

4. The image forming apparatus of claim 2, wherein, on making the first CPU recover, the second CPU gives the first CPU a restart instruction.

5. The image forming apparatus of claim 2, wherein, on making the first CPU recover, the second CPU gives the first CPU an instruction to start the processing of the print job on a basis of the job management information updated by the second CPU, in response to detecting that the first CPU has recovered from the abnormal state.

6. The image forming apparatus of claim 1, wherein
the first CPU, on performing the job management, writes information about whether one page of the image data to be printed has been created, into the job management information, and
the second CPU, on maintaining the processing of the print job,
determines whether whole of one page, which is currently processed to be printed, of the image data has already been created, on a basis of the job management information, and
creates a certain image data representing a defective print and outputs the certain image data to the print engine, on determining that whole of the one page of the image data has not been created and a part of the one page has already been printed.

7. The image forming apparatus of claim 1, wherein the first CPU and the second CPU are cores forming one multi-core CPU.

8. A method of controlling job processing in an image forming apparatus including a print engine that prints image data onto a sheet of paper, while conveying the sheet from a sheet feeding unit to a sheet ejecting unit, a first CPU that controls operation of the image forming apparatus except for the print engine, a second CPU that controls operation of the print engine, and a shared memory including a data area to which the first CPU and the second CPU can access, the method comprising:
on executing processing of a print job, causing the first CPU to perform processing including
performing a job management including managing job management information, the job management information including setup values about the print job and progress of the print job, and storing the job management information in the data area of the shared memory, and outputting image data to be printed, stored in the data area, to the print engine; and
causing the second CPU to perform processing including
monitoring an operation state of the first CPU, determining whether an abnormality is occurring in the operation of the first CPU, the abnormality interrupting the job management and the outputting the image data, and
maintaining the processing of the print job, on determining that the abnormality is occurring in the operation of the first CPU, the maintaining the processing including outputting the image data to be printed, stored in the data area, to the print engine on a basis of the job management information stored in the data area, as proxy for the first CPU and performing the job management on the job management information stored in the data area, as proxy for the first CPU,
wherein the maintaining the processing of the print job includes giving the print engine an instruction to reduce at least one of speed of the print engine at conveying sheets, speed of the print engine at transferring images on sheets, and speed of the print engine at fixing images on sheets, in response to determining that the abnormality is occurring in the operation of the first CPU, and
wherein the second CPU gives a second instruction to return the print engine to normal speed when the print job is completed or when no part of one page, which is currently processed to be printed, of the image data has already been created.

9. The method of claim 8, wherein the processing performed by the second CPU further includes making the first CPU recover from an abnormal state, on determining that the abnormality is occurring in the operation of the first CPU.

10. The method of claim 9, wherein the making the first CPU recover includes giving the first CPU an instruction to release the shared memory.

11. The method of claim 9, wherein the making the first CPU recover includes giving the first CPU a restart instruction.

12. The method of claim 9, wherein the making the first CPU recover includes giving the first CPU an instruction to start the processing of the print job on a basis of the job management information updated by the second CPU, in response to detecting that the first CPU has recovered from the abnormal state.

13. The method of claim 8, wherein the performing the job management by the first CPU includes writing information about whether one page of the image data to be printed has been created, into the job management information, and
the maintaining the processing of the print job includes,
determining whether whole of one page, which is currently processed to be printed, of the image data has already been created, on a basis of the job management information, and
creating a certain image data representing a defective print and outputs the certain image data to the print engine, on determining that whole of the one page of the image data has not been created and a part of the one page has already been printed.

14. The method of claim 8, wherein the first CPU and the second CPU are cores forming one multi-core CPU.

15. A non-transitory computer-readable storage medium storing a program for controlling job processing in an image forming apparatus including a print engine that prints image data onto a sheet of paper, while conveying the sheet from a sheet feeding unit to a sheet ejecting unit, a first CPU that controls operation of the image forming apparatus except for the print engine, a second CPU that controls operation of the print engine, and a shared memory including a data area to which the first CPU and the second CPU can access,
wherein the first CPU, on executing processing of a print job, performs a job management including managing job management information, the job management information including setup values about the print job and progress of the print job, and outputs image data to be printed, stored in the data area, to the print engine, and wherein the program causes the second CPU to perform processing comprising:

monitoring an operation state of the first CPU, determining whether an abnormality is occurring in the operation of the first CPU, the abnormality interrupting the job management and the outputting the image data, and maintaining the processing of the print job, on determining that the abnormality is occurring in the operation of the first CPU, the maintaining the processing including outputting the image data to be printed, stored in the data area, to the print engine on a basis of the job management information stored in the data area, as proxy for the first CPU and performing the job management on the job management information stored in the data area, as proxy for the first CPU, wherein the maintaining the processing of the print job includes giving the print engine an instruction to reduce at least one of speed of the print engine at conveying sheets, speed of the print engine at transferring images on sheets, and speed of the print engine at fixing images on sheets, in response to determining that the abnormality is occurring in the operation of the first CPU, and wherein the second CPU gives a second instruction to return the print engine to normal speed when the print job is completed or when no part of one page, which is currently processed to be printed, of the image data has already been created.

16. The non-transitory computer-readable storage medium of claim 15, wherein the job management performed by the first CPU includes writing information about whether one page of the image data to be printed has been created, into the job management information, and the maintaining the processing of the print job includes, determining whether whole of one page, which is currently processed to be printed, of the image data has already been created, on a basis of the job management information, and creating a certain image data representing a defective print and outputs the certain image data to the print engine, on determining that whole of the one page of the image data has not been created and a part of the one page has already been printed.

* * * * *